(12) United States Patent
Durchholz et al.

(10) Patent No.: US 8,028,802 B2
(45) Date of Patent: Oct. 4, 2011

(54) METHOD AND SYSTEM FOR DAMPED ACOUSTIC PANELS

(75) Inventors: Anthony J. Durchholz, Loveland, OH (US); Carlos M. Figueroa, Cincinnati, OH (US); Matthew F. Kluesener, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 211 days.

(21) Appl. No.: 12/165,143

(22) Filed: Jun. 30, 2008

(65) Prior Publication Data

US 2009/0321178 A1 Dec. 31, 2009

(51) Int. Cl.
*E04B 1/82* (2006.01)

(52) U.S. Cl. ........ 181/290; 181/284; 181/210; 181/213; 181/214; 244/1 N; 415/119

(58) Field of Classification Search .......... 181/190, 181/284, 210, 213, 214, 290; 244/1 N; 415/119
See application file for complete search history.

(56) References Cited

U.S. PATENT DOCUMENTS

| | | | |
|---|---|---|---|
| 4,106,587 A * | 8/1978 | Nash et al. | 181/213 |
| 4,137,992 A | 2/1979 | Herman | |
| 4,293,053 A * | 10/1981 | Shuttleworth et al. | 181/213 |
| 5,014,815 A | 5/1991 | Arcas et al. | |
| 5,025,888 A | 6/1991 | Arcas et al. | |
| 5,160,248 A * | 11/1992 | Clarke | 415/9 |
| 5,196,253 A * | 3/1993 | Mueller et al. | 428/138 |
| 5,275,529 A * | 1/1994 | Langenbrunner et al. | 415/119 |
| 5,336,044 A * | 8/1994 | Forrester | 415/9 |
| 5,344,280 A * | 9/1994 | Langenbrunner et al. | 415/9 |
| 5,581,054 A | 12/1996 | Anderson et al. | |
| 6,123,170 A * | 9/2000 | Porte et al. | 181/214 |
| 6,761,245 B2 | 7/2004 | Porte | |
| 6,920,958 B2 | 7/2005 | Harrison | |
| 7,047,725 B2 | 5/2006 | Moe et al. | |
| 7,257,894 B2 | 8/2007 | Buge et al. | |
| 2004/0007422 A1* | 1/2004 | Porte et al. | 181/210 |
| 2006/0124388 A1* | 6/2006 | Pompei | 181/290 |
| 2009/0324390 A1* | 12/2009 | Harper et al. | 415/119 |

OTHER PUBLICATIONS

EAR Standard Parts Catalog and Engineerign Design Guide, printed Jan. 9, 2005.*

* cited by examiner

*Primary Examiner* — Forrest M Phillips

(74) *Attorney, Agent, or Firm* — David J. Clement, Esq.; Armstrong Teasdale LLP

(57) ABSTRACT

A method and system for an acoustic panel system are provided. The system includes a plurality of acoustic panel segments aligned circumferentially about an inner diameter of a fan containment case wherein each segment includes a radially inner surface defining a portion of a fluid duct, a radially outer surface defining a gap between the fan containment case and the acoustic panel segment, and an aft end lip configured to be inserted into a mating groove in the fan containment case. The system also includes at least one damping bumper coupled to the radially outer surface wherein the bumper extends from the radially outer surface to the fan containment case and comprises an energy absorbing elastomeric material configured to facilitate dissipating a forced response of a vibratory stimulus.

19 Claims, 4 Drawing Sheets

METHOD AND SYSTEM FOR DAMPED ACOUSTIC PANELS

BACKGROUND OF THE INVENTION

This invention relates generally to noise reduction panels and, more particularly, to a method and system for improving a vibratory response of noise reduction panels.

At least some known acoustic panels used to line the fan flowpath of a turbine engine for noise reduction may be exposed to a high vibratory forcing function, much of which can be due to the aero shock waves of fan blade passing. Initial design intent is to make the panels and their supporting structure stiff enough so that they do not respond to this stimulus. Weight and/or maintainability design constraints sometimes undermine this design intent. For example, a bolted-on panel is preferable to a panel that is bonded to the fan case for maintainability, allowing easy replacement of damaged panels in service. Also, to reduce weight, panel section properties may be minimized. These added design constraints may reduce the installed panel stiffness, causing it to have a small frequency margin from the driving excitation. This may result in a forced vibratory response that may cause excessive alternating stress in the panels and/or its supporting fasteners.

For example, a forward acoustic panel of some known engines is a composite laminate structure that is bolted to a radially inner surface of the engine fan containment case, just forward of the fan blades. The forward end of each panel is supported by bolts that span the arc covered by the panel. The aft end is supported by insertion of a lip formed in the panel into a mating groove of the fan case. Between these supports the panels are free to vibrate, restricted only by elastomeric spacers bonded to the outer surface of the panel and residing in the small radial gap between the panel and the inner surface of the fan case. When the vibration amplitude of the unsupported portion of the panels exceeds the gap between the spacers and the fan case, the spacers act as springs in compression and add stiffness to the overall panel. However, since the spacers have very little damping, they act as almost purely elastic springs, dissipating very little vibrational energy. The overall affect of the spacers is not enough to make the panel unresponsive to blade passing stimulus.

BRIEF DESCRIPTION OF THE INVENTION

In one embodiment, an acoustic panel system includes a plurality of acoustic panel segments aligned circumferentially about an inner diameter of a fan containment case wherein each segment includes a radially inner surface defining a portion of a fluid duct, a radially outer surface defining a gap between the fan containment case and the acoustic panel segment, and an aft end lip configured to be inserted into a mating groove in the fan containment case. The system also includes at least one damping bumper coupled to the radially outer surface wherein the bumper extends from the radially outer surface to the fan containment case and comprises an energy absorbing elastomeric material configured to facilitate dissipating a forced response of a vibratory stimulus.

In another embodiment, a method of improving a vibratory response of an acoustic panel to a blade passing stimulus includes removing the acoustic panel from a fan containment case, coupling one or more damping bumpers to a radially outer surface of the acoustic panel wherein the damping bumpers comprise an energy absorbing elastomeric material configured to facilitate dissipating a forced response of the blade passing stimulus, and coupling the acoustic panel to the fan containment case.

In yet another embodiment, an acoustic panel includes a panel body that includes a composite laminate structure. The panel body includes a concave surface configured to define a portion of a fluid duct, a convex surface configured to define a gap between a fan containment case and the panel body, and an aft end lip configured to be inserted into a mating groove in the fan containment case. The acoustic panel also includes at least one damping bumper coupled to the concave surface. The bumper is sized to extend from the convex surface to the fan containment case when the panel body is installed. The damping bumper comprises an energy absorbing elastomeric material configured to facilitate dissipating a forced response of a vibratory stimulus.

BRIEF DESCRIPTION OF THE DRAWINGS

FIG. 1 a schematic illustration of a gas turbine engine including a fan assembly and a core engine including a high pressure compressor, and a combustor;

FIG. 2 is a side cutaway view of a portion of fan containment case shown in FIG. 1;

FIG. 3 is a plan view of acoustic panel taken along lines 3-3, shown in FIG. 2, in accordance with an embodiment of the present invention; and FIG. 4 is a side view of acoustic panel taken along lines 4-4, shown in FIG. 3, in accordance with an embodiment of the present invention.

DETAILED DESCRIPTION OF THE INVENTION

The following detailed description illustrates embodiments of the invention by way of example and not by way of limitation. It is contemplated that the invention has general application to reducing a vibratory response of equipment and ductwork in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
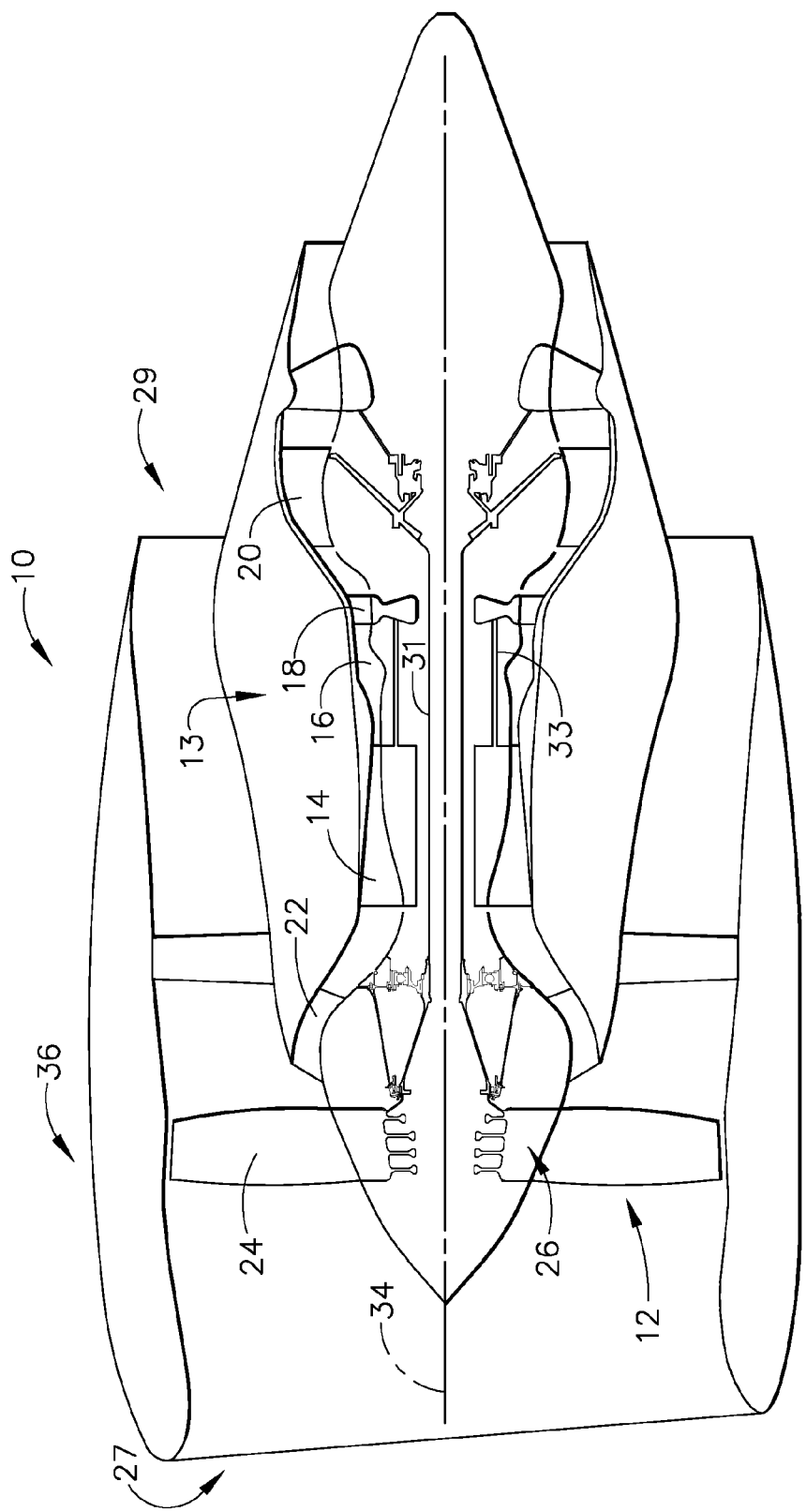
FIGS. 1-4 show exemplary embodiments of the method and system described herein.

FIG. 1 a schematic illustration of a gas turbine engine 10 including a fan assembly 12 and a core engine 13 including a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has a forward intake side 27 and an aft exhaust side 29. In one embodiment, the gas turbine engine is a GE90 available from General Electric Company, Cincinnati, Ohio. Fan assembly 12 and turbine 20 are coupled by a first rotor shaft 31, and compressor 14 and turbine 18 are coupled by a second rotor shaft 33. A fan containment case 36 at least partially surrounds fan assembly 12.

During operation, air flows axially through fan assembly 12, in a direction that is substantially parallel to a central axis 34 extending through engine 10, and compressed air is supplied to high pressure compressor 14. The highly compressed air is delivered to combustor 16. Airflow (not shown in FIG. 1) from combustor 16 drives turbines 18 and 20, and turbine 20 drives fan assembly 12 by way of shaft 31.

Figure 2:
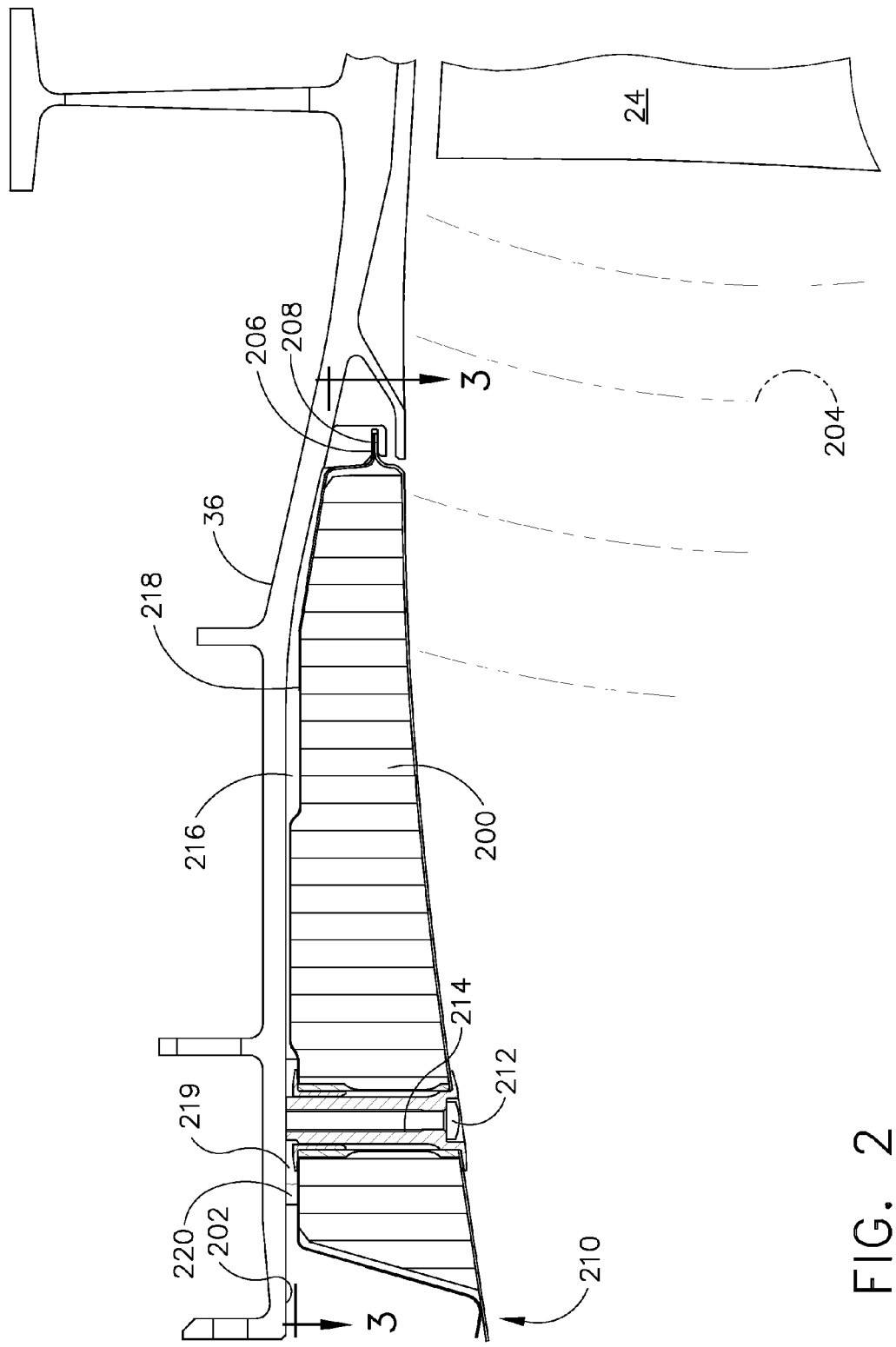

FIG. 2 is a side cutaway view of a portion of fan containment case 36 (shown in FIG. 1). In the exemplary embodiment, a forward acoustic panel 200 is removably coupled to fan containment case 36 forward of blades 24. A set (not shown) of acoustic panels 200 extends circumferentially about a radially inner surface 202 of fan containment case 36. In the exemplary embodiment, eight acoustic panels extend about an approximately 45° portion of the circumference. In other embodiments, other numbers of panels may be used to extend substantially around the circumference of the fan containment case 36. Acoustic panels 200 are subject to a relatively high vibratory forcing function due to aero shock waves 204 of fan blade passing. To mitigate the noise generated by aero shock waves 204 impinging components in fan containment case 36 and exiting forward intake side 27, acoustic panels 200 are used to line inner surface 202 of fan containment case 36.

Acoustic panels 200 are formed of a composite laminate structure that is coupled to inner surface 202 using a lip 206 formed in an aft edge of acoustic panels 200. Lip 206 is configured to fit into a complementarily-shaped groove 208 that extends circumferentially about inner surface 202. A forward edge 210 of acoustic panels 200 includes one or more fasteners 212 that extend through a respective aperture 214 formed in acoustic panels 200. Fasteners 212 are configured to anchor acoustic panels 200 to fan containment case 36. When acoustic panels 200 are installed, a gap 216 is formed between a radially outer convex surface 218 of acoustic panels 200 and inner surface 202.

In one embodiment, spacers 219 are coupled to outer convex surface 218 and reside in gap 216. During operation, when the vibration amplitude of the unsupported portion of acoustic panels 200 exceeds a gap between the bumpers and the fan case, the bumpers act as springs in compression and add stiffness to the overall panel. However, because spacers 219 have relatively less damping capability, they act as almost purely elastic springs, dissipating very little vibrational energy. The overall affect of spacers 219 is not enough to make the panel unresponsive to blade passing stimulus.

One or more damping bumpers 220 are positioned within gap 216 and extend radially between inner surface 202 and outer convex surface 218. Damping bumpers 220 are formed from a material that includes a relatively high internal damping capability such that damping bumpers 220 not only add stiffness to acoustic panels 200, but also add substantial damping to the forced response from the blade passing stimulus and thereby facilitates reducing the amplitude of vibration. Such reduction in vibration facilitates limiting a resultant panel and fastener stress to acceptable levels. In one embodiment, damping bumpers 220 are formed from an energy absorbing material such as an elastomeric material that may include a polyvinyl chloride-based elastomer. Another elastomeric material is an ISODAMP C-2003-125psa elastomeric sheet material available from E-A-R Corporation of Indianapolis, Ind. ISODAMP is a federally registered trademark of Cabot Safety Intermediate Corporation of Southbridge, Mass.

The application of damping bumpers 220 to acoustic panel 200 effectively dissipates the forced response of the fan blade passing stimulus. The comparative frequency response of acoustic panels 200 with damping bumpers 220 is improved over that of an acoustic panel (not shown) using twice the fasteners, reducing the vibratory response in the range of fan blade passing frequency to less than approximately one half of current levels.

Figure 3:
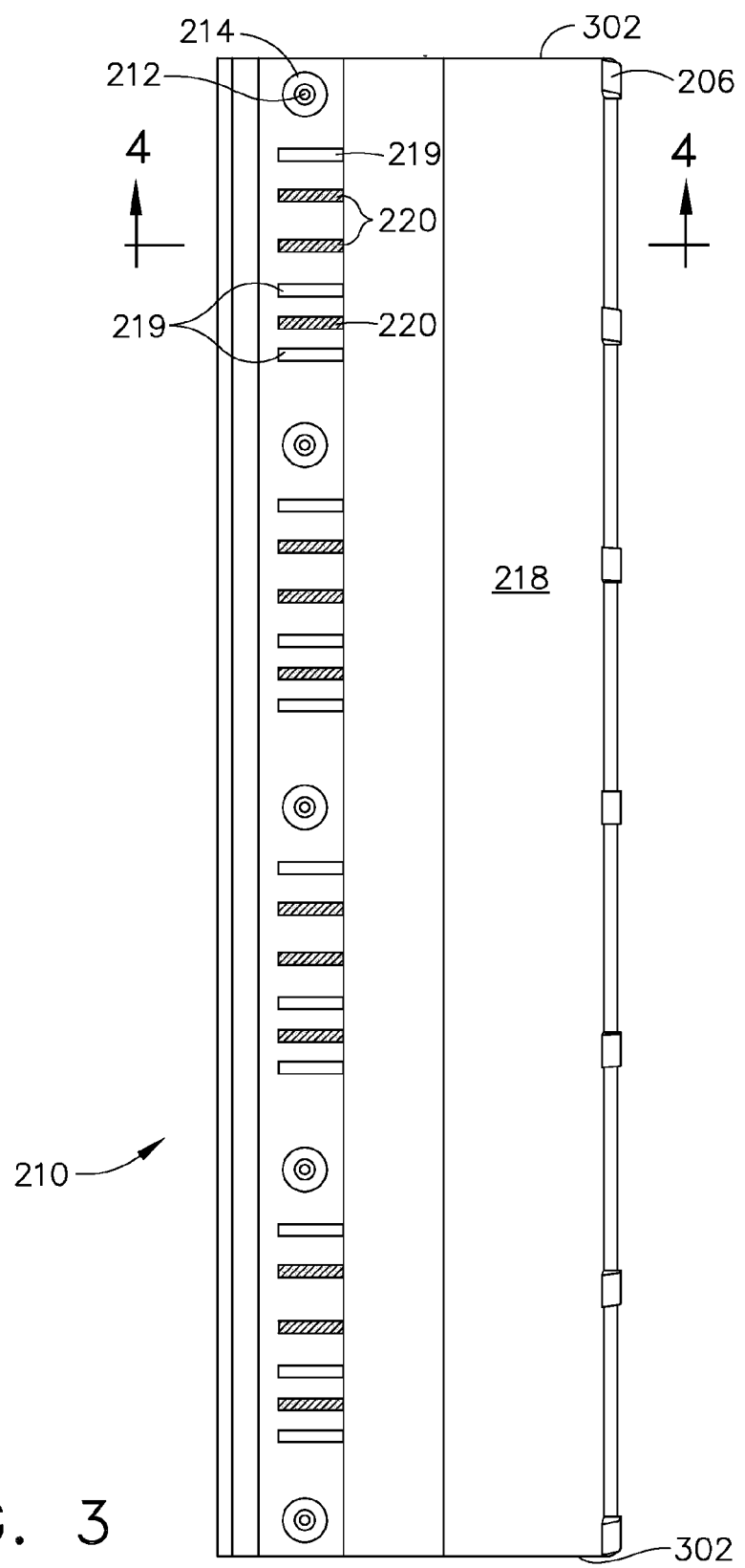

FIG. 3 is a plan view of acoustic panel 200 taken along lines 3-3 (shown in FIG. 2) in accordance with an embodiment of the present invention. In the exemplary embodiment, acoustic panel 200 includes aft edge lip 206 and forward edge 210. Side edges 302 are configured to abut or nearly abut adjacent acoustic panels 200 such that acoustic panels 200 extend circumferentially about inner surface 202 of fan containment case 36. Acoustic panel 200 includes a plurality of apertures 214 formed in forward edge 210. Apertures 214 are configured to receive fasteners 212. Acoustic panel 200 includes a plurality of spacers 219 and damping bumpers 220 spaced alternately along forward edge 210 and between apertures 214.

Figure 4:
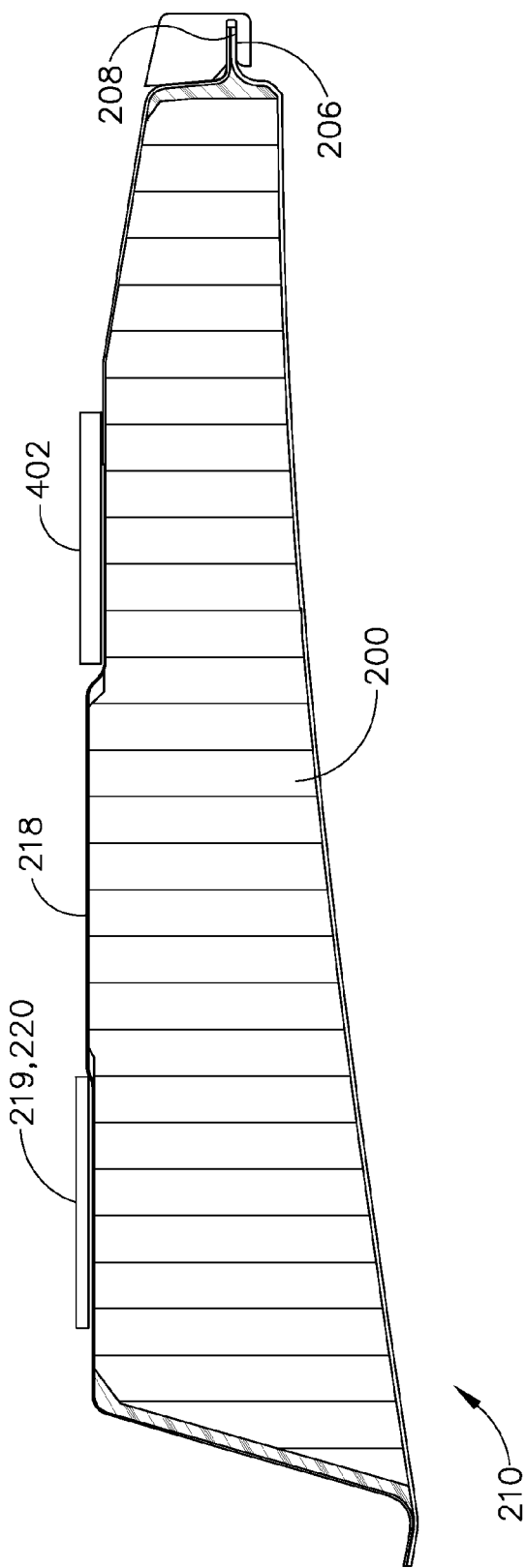

FIG. 4 is a side view of acoustic panel 200 taken along lines 4-4 (shown in FIG. 3) in accordance with an embodiment of the present invention. In the exemplary embodiment, acoustic panel 200 includes aft edge lip 206 and forward edge 210. Acoustic panel 200 includes a plurality of spacers 219 and damping bumpers 220 spaced alternately along forward edge 210. Acoustic panel 200 also includes a plurality of aft damping bumpers 402 spaced aft of spacers 219 and damping bumpers 220. Damping bumpers 402 are coupled and/or bonded to outer convex surface 218 to provide additional stiffness and damping capability.

The above-described embodiments of a method and system of improving a vibratory response of an acoustic panel provide a cost-effective and reliable means for reducing the possibility of fastener liberation. More specifically, the methods and system described herein facilitate reducing costly fan blade damage and unscheduled engine maintenance. As a result, the methods and systems described herein facilitate operating and maintaining noise reduction panels in a cost-effective and reliable manner.

While the disclosure has been described in terms of various specific embodiments, it will be recognized that the disclosure can be practiced with modification within the spirit and scope of the claims.

What is claimed is:

1. An acoustic panel system comprising:
    a plurality of acoustic panel segments aligned circumferentially about an inner diameter of a fan containment case, each segment comprising a radially inner surface defining a portion of a fluid duct, a radially outer surface defining a gap between the fan containment case and the acoustic panel segment, and an aft end lip configured to be inserted into a complementarily-shaped mating groove that extends circumferentially about an inner surface of the fan containment case;
    at least one damping bumper coupled to the radially outer surface, said bumper extending from the radially outer surface to the fan containment case, said damping bumper comprising an energy absorbing elastomeric material configured to facilitate dissipating a forced response of a vibratory stimulus; and
    one or more fasteners extending through a forward edge of each of the plurality of acoustic panel segments from said radially inner surface to the fan containment case, said one or more fasteners configured to anchor a respective acoustic panels to the fan containment case; said at least one damping bumper circumferentially spaced apart from said one or more fasteners.

2. An acoustic panel system in accordance with claim 1 wherein said one or more forward fasteners comprise at least one aperture extending radially through said panel segments and a threaded member extending through said aperture to a mating surface complementary to said threaded member.

3. An acoustic panel system in accordance with claim 1 further comprising a mating groove formed in the inner diameter of the fan containment case configured to receive the aft end lip.

4. An acoustic panel system in accordance with claim 1 wherein the vibratory stimulus is a fan blade passing stimulus.

5. An acoustic panel system in accordance with claim 1 wherein said plurality of acoustic panel segments are positioned upstream of a fan.

6. An acoustic panel system in accordance with claim 1 wherein said plurality of acoustic panel segments comprise a composite laminate structure.

7. An acoustic panel system in accordance with claim 1 wherein said at least one damping bumper is positioned axially between said one or more forward fasteners and said aft end lip.

8. An acoustic panel system in accordance with claim 1 wherein said at least one damping bumper comprises a polyvinyl chloride-based elastomer.

9. A method of improving a vibratory response of an acoustic panel to a blade passing stimulus, said method comprising:
   unfastening one or more fasteners extending through one or more apertures in a forward edge of an acoustic panel segment;
   sliding the acoustic panel segment towards a direction of the forward edge to disengage a lip on an aft edge of the acoustic panel segment from a complementarily-shaped groove that extends circumferentially about an inner surface of a fan containment case;
   removing the acoustic panel from the fan containment case;
   coupling one or more damping bumpers to a radially outer surface of the acoustic panel, said one or more damping bumpers circumferentially spaced apart from said one or more apertures in the acoustic panel, wherein the damping bumpers comprise an energy absorbing elastomeric material configured to facilitate dissipating a forced response of the blade passing stimulus; and
   coupling the acoustic panel to the fan containment case.

10. A method in accordance with claim 9 wherein coupling one or more damping bumpers to a radially outer surface of the acoustic panel comprises coupling one or more damping bumpers between an axially forward fastener and an axially aft end lip.

11. A method in accordance with claim 9 wherein coupling one or more damping bumpers to a radially outer surface of the acoustic panel comprises coupling one or more damping bumpers that each comprises a polyvinyl chloride-based elastomer to a radially outer surface of the acoustic panel.

12. A method in accordance with claim 9 wherein removing the acoustic panel from a fan containment case comprises removing one or more axially forward fasteners from the fan containment case.

13. A method in accordance with claim 9 wherein removing the acoustic panel from a fan containment case comprises removing an axially aft end lip from a groove in the fan containment case.

14. An acoustic panel comprising: a panel body comprising a composite laminate structure, said panel body comprising a concave surface configured to define a portion of a fluid duct, a convex surface configured to define a gap between a fan containment case and said panel body, and an aft end lip configured to be inserted into a complementarily-shaped mating groove that extends circumferentially about an inner surface of the fan containment case;
   at least one damping bumper coupled to said convex surface, said bumper sized to extend from said convex surface to the fan containment case when the panel body is installed, said damping bumper comprising an energy absorbing elastomeric material configured to facilitate dissipating a forced response of a vibratory stimulus; and
   at least one spacer coupled to said convex surface and offset circumferentially from said at least one damping bumper, said at least one spacer sized to extend from said convex surface to the fan containment case when the panel body is installed.

15. An acoustic panel in accordance with claim 14 further comprising one or more forward fasteners spaced along a forward edge of said acoustic panel.

16. An acoustic panel system in accordance with claim 15 wherein said at least one damping bumper is positioned axially between said one or more forward fasteners and said aft end lip.

17. An acoustic panel in accordance with claim 14 wherein the vibratory stimulus is a fan blade passing stimulus.

18. An acoustic panel system in accordance with claim 14 wherein said at least one damping bumper comprises a polyvinyl chloride-based elastomer.

19. An acoustic panel system in accordance with claim 14 wherein said at least one damping bumper comprises a relatively high internal damping capability.

* * * * *